Sept. 18, 1956   O. E. STAPLES   2,763,102
DRESSING DEVICE

Original Filed March 8, 1951   11 Sheets-Sheet 1

INVENTOR.
OTIS E. STAPLES
BY Hudson, Boughton,
Williams, David & Hoffmann
ATTORNEYS Sept. 18, 1956  O. E. STAPLES  2,763,102
DRESSING DEVICE Original Filed March 8, 1951  11 Sheets-Sheet 2

INVENTOR.
OTIS E. STAPLES
BY Hudson, Doughton,
Williams, David & Hoffmann
ATTORNEYS Sept. 18, 1956     O. E. STAPLES     2,763,102
DRESSING DEVICE Original Filed March 8, 1951     11 Sheets-Sheet 3

INVENTOR.
OTIS E. STAPLES
BY Hudson, Boughton,
Williams, David & Hoffmann
ATTORNEYS Sept. 18, 1956

O. E. STAPLES 2,763,102

DRESSING DEVICE

Original Filed March 8, 1951

INVENTOR.
OTIS E. STAPLES
BY Hudson, Boughton,
Williams, David & Hoffmann
ATTORNEYS Sept. 18, 1956     O. E. STAPLES     2,763,102
DRESSING DEVICE Original Filed March 8, 1951     11 Sheets-Sheet 6

INVENTOR.
OTIS E. STAPLES
BY Hudson, Boughton,
Williams, David & Hoffmann
ATTORNEYS Sept. 18, 1956      O. E. STAPLES      2,763,102
DRESSING DEVICE Original Filed March 8, 1951      11 Sheets-Sheet 7

INVENTOR
OTIS E. STAPLES
BY Hudson, Boughton,
Williams, David & Hoffmann
ATTORNEYS Sept. 18, 1956    O. E. STAPLES    2,763,102
DRESSING DEVICE Original Filed March 8, 1951    11 Sheets-Sheet 8

INVENTOR.
OTIS E. STAPLES
BY Hudson, Boughton,
Williams, David & Hoffmann
ATTORNEYS Sept. 18, 1956     O. E. STAPLES     2,763,102
DRESSING DEVICE Original Filed March 8, 1951     11 Sheets-Sheet 10

INVENTOR.
OTIS E. STAPLES
BY
ATTORNEYS

INVENTOR.
OTIS E. STAPLES

United States Patent Office 2,763,102
Patented Sept. 18, 1956

2,763,102

DRESSING DEVICE

Otis E. Staples, Euclid, Ohio, assignor to The Cleveland Hobbing Machine Company, Euclid, Ohio, a corporation of Ohio Original application March 8, 1951, Serial No. 214,540, now Patent No. 2,642,702, dated June 23, 1954. Divided and this application May 18, 1953, Serial No. 355,563

4 Claims. (Cl. 51—55)

The present invention relates to machines for finishing the teeth of gears, splines and the like by grinding wherein the work is rotated in predetermined relationship with a cylindrical grinding wheel having a helical tooth or thread on its periphery and, more particularly, to devices for dressing the grinding wheel.

The principal object of the present invention is the provision of a novel and improved crush roller for dressing grinding wheels of machines for grinding gears, splines and the like, wherein the work is rotated in predetermined relationship with a cylindrical grinding wheel having a helical tooth or thread on its periphery, which roller has the external sides of its end convolutions relieved so that when it is applied to a grinding wheel, the outer sides of the end convolutions will not engage the teeth or thread of the grinding wheel thereby lessening, if not entirely eliminating, the possibility of braking off the end convolutions of the grinding wheel during crushing.

Another object of the invention is the provision of a novel and improved dressing mechanism for grinding wheels of machines of the general character referred to which will facilitate maintaining the wheel in its correct form.

The invention resides in certain constructions and combinations and arrangements of parts and further objects and advantages will be apparent to those skilled in the art to which the invention relates from the following description of the preferred embodiment described with reference to the accompanying drawings forming a part of this specification in which similar reference characters designate corresponding parts, and in which.

Figure 10:
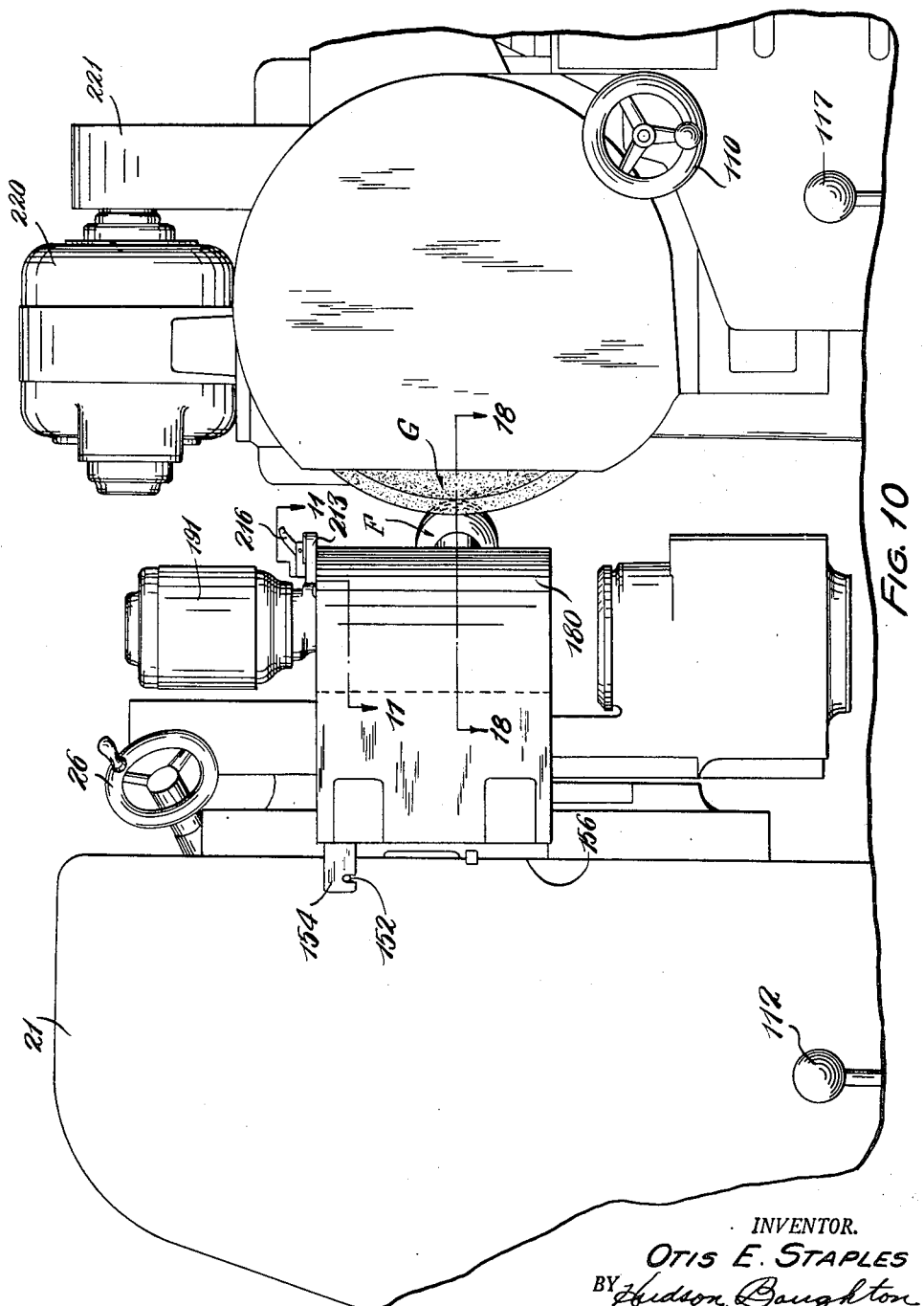
Fig. 10 is a front elevational view of the machine as shown in Fig. 9.
Figure 14:
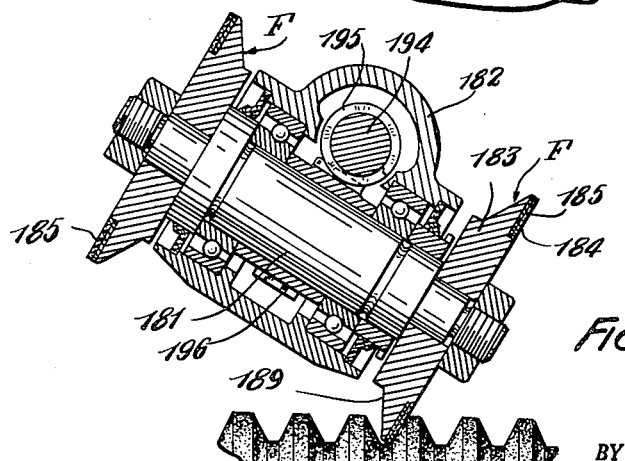
Figure 12:
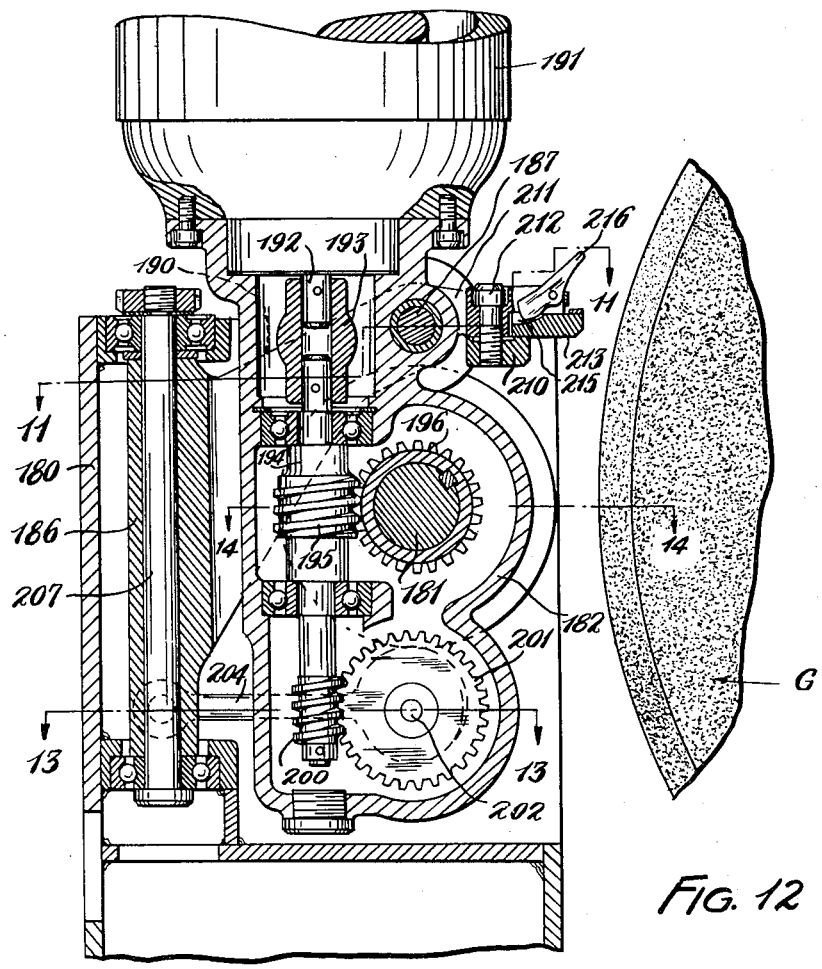
Fig. 12 is a fragmentary sectional view on the line 12—12 of Figs. 9, 11 and 13.
Figure 13:
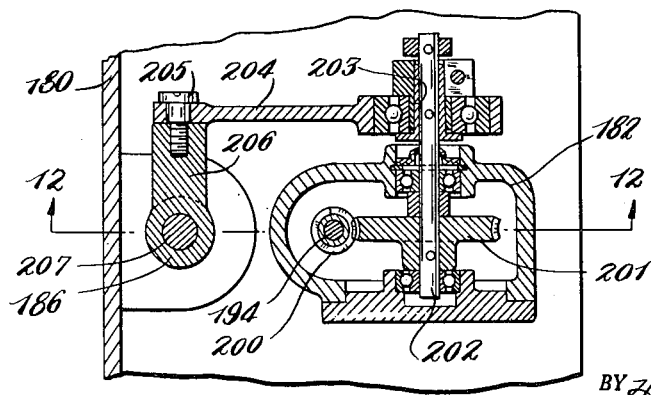

Fig. 13 is a fragmentary sectional view approximately on the line 13—13 of Fig. 12; and Fig. 14 is a fragmentary sectional view approximately on the line 14—14 of Figs. 10 and 12.

The present invention may be embodied in machines of different construction but, for purposes of illustration, is herein shown and described as embodied in a machine especially adapted for grinding gears of the approximate size used in automobile speed change transmissions and the like. This application is a division of my copending application Serial No. 214,540, filed March 8, 1951, upon which United States Letter Patent No. 2,642,702 issued June 23, 1954.

In general, the machine shown comprises an L-shaped base or bed A having transversely extending ways 10, 11 on its right-hand end as viewed from the front, upon which ways a slide, designated generally as B, hereinafter called the grinding wheel carriage or slide, is supported. The grinding wheel slide B carries a grinding wheel G of cylindrical form and having a helical tooth 12 on its periphery adapted to project into the interdental spaces of the work in the form of a gear W and grind the flanks of the teeth thereof when both are rotated at predetermined speeds while in proper spaced relation to each other. During the grinding operation, the work W is moved in a generally vertical direction to produce a relative feed movement of the work past the grinding wheel and the grinding wheel carriage or slide B is moved along the ways 10, 11 to produce a relative movement between the work and grinding wheel parallel with the axis of rotation of the grinding wheel, thereby distributing the wear over the face of the grinding wheel.

The work or gear W is supported on an arbor 13, the lower end of which is connected to a chuck 14 attached to the upper end of a work spindle 15 rotatably supported in suitable bearings in a work head frame member 16. The upper end of the arbor 13 is engaged by a center 17 connected to a slide 18 reciprocable on the member 16 toward and from the chuck 14 in a suitable manner. The member 16 comprises a boss projecting into a generally vertical column 21 through the medium of which boss the work head frame member 16 is rotatably supported in a slide 22 carried by the column 21 for linear movement in a generally vertical direction. The work head frame member 16 is adapted to be rotated relative to the slide 22 and held in any desired angular position with respect thereto by a worm wheel fixed to the rear end of a shaft rotatably carried by the slide 22 and continuously in mesh with a worm gear 25 fixed to the boss 20 of the work head frame member 16. The outer end of the shaft to which the worm gear is affixed has its outer projecting end provided with a hand wheel 26 through the medium of which the shaft may be conveniently rotated and the work head frame 16 angularly adjusted relative to the slide 22. A suitable clamp may be employed for retaining the work head frame member 16 in any adjusted position relative to the slide 22.

The slide 22 is carried by the column 21 through the medium of suitable ways 27, 28 at opposite sides of the slide 22 and is adapted to be moved in a generally vertical direction along the column 21 by a fluid pressure actuated motor fixed in the column 21 and having its piston rod connected to the slide 22.

Figure 1:
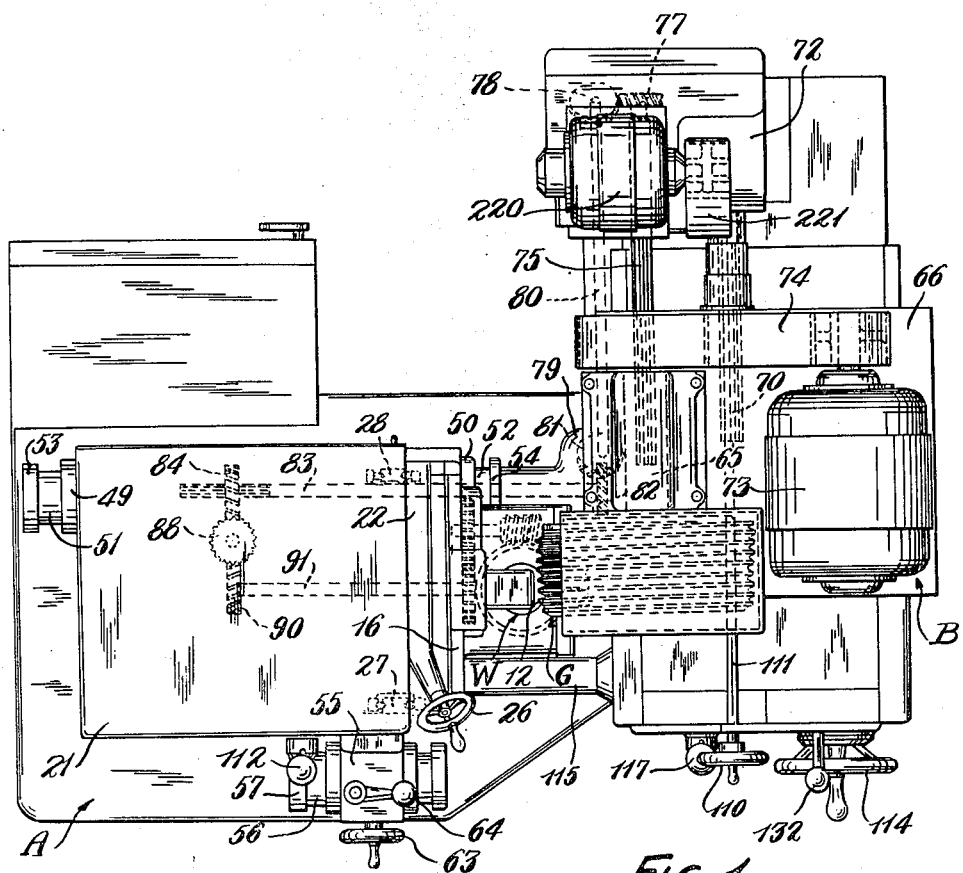
Fig. 1 is a plan view of a gear grinding machine embodying the invention.
Figure 2:
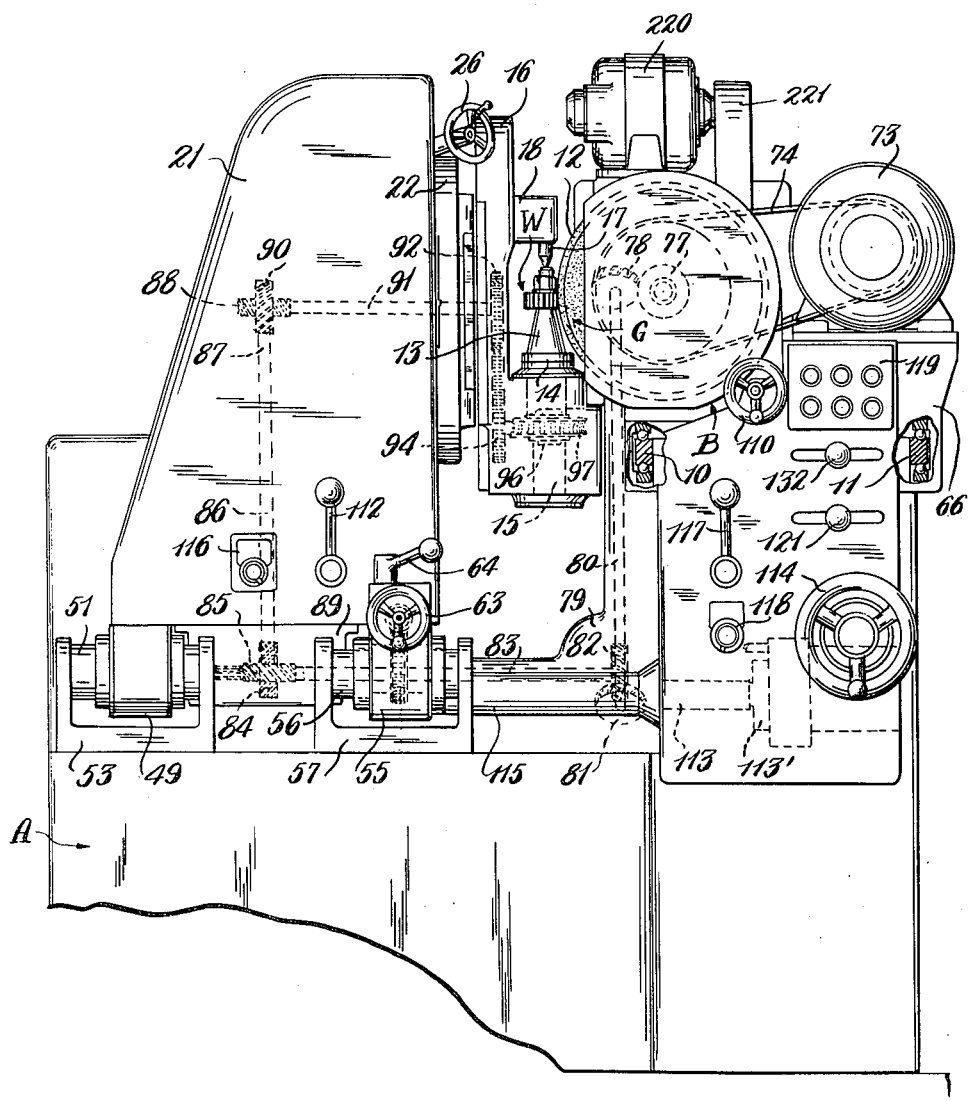
Fig. 2 is a fragmentary front elevational view of the machine shown in Fig. 1, with parts broken away to show details of the construction.
Figure 3:
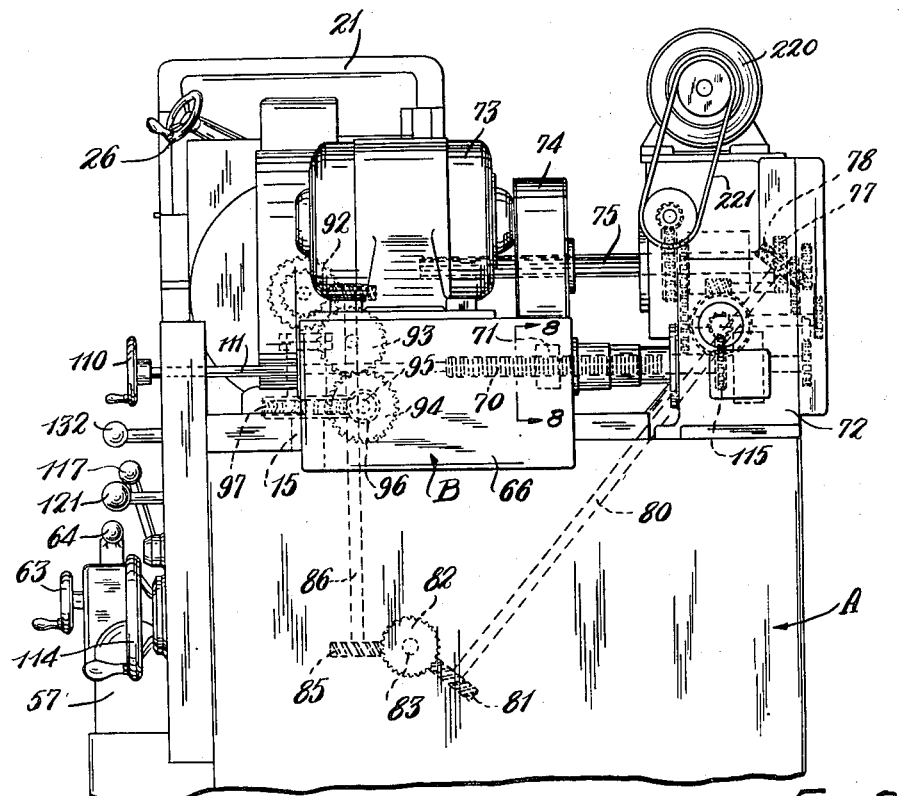
Fig. 3 is an end elevational view, looking from the right, as viewed in Fig. 2.

The base of the column 21 is generally rectangular in shape and is pivotally connected to the bed A of the machine by journal boxes 49, 50 connected to the underside of the column and rotatably supported on suitable tubular journals 51, 52 carried by brackets 53, 54, respectively, supported on the upper side of the bed A. The tubular journal members 51, 52 are longer than the journal boxes 49, 50, thus permitting adjustment or movement of the column 21 therealong in a manner and for a purpose hereinafter specifically referred to. The front end of the column 21, as viewed in Figs. 1 and 2, is supported by a single journal box 55 connected thereto adjacent the front right-hand side, which journal box is shorter than and is carried by a tubular journal member 56 carried by a bracket 57 supported on the base A. The journal box 55 includes an eccentric sleeve rotatable therein and having a worm gear formed on its exterior intermediate its ends, which worm gear is continuously engaged by a worm wheel carried on the rear end of a generally horizontal shaft, the front end of which projects to the front of the journal box where it is provided with a hand wheel 63. The construction is such that upon rotation of the hand wheel 63 the eccentric sleeve within the journal box 55 is rotated and the column 21 adjusted about the journals 51, 52 at its rear side. A clamp 64 provides means for holding the eccentric sleeve in any adjusted position.

The grinding wheel G is carried on a generally horizontal shaft 65 rotatably supported in the frame 66 of the horizontally reciprocable grinding wheel slide or carrier B supported on the base A of the machine by the ways 10, 11 which are similar in construction to those employed to slidably support the slide 22 in the column 21. The ways upon which the carriage B is supported are at right angles to the axes of the journals 51, 52 and the slide or carrier B is adapted to be moved therealong by a cooperating lead screw 70 and nut 71. The lead screw 70 is rotatably supported against endwise movement in a gear box 72 bolted to the base A and the nut 71 is fixedly secured to the rear wall of the frame 66 of the carrier B. The shaft 65 and in turn the grinding wheel G are adapted to be rotated by an electric drive motor 73 bolted to the upper side of the member 66 and operatively connected to the shaft 65 by a suitable belt drive 74 of commercial construction.

During the grinding operation, the work spindle 15 and, in turn, the work W are rotated in timed relation to the rotation of the grinding wheel G in the following manner: The rear end of the spindle or shaft 65 upon which the grinding wheel G is carried is hollow and has the forward end of a shaft 75 rotatably supported in the gear case 72 against axial movement projecting therein. The two shafts 65, 75 have cooperating splines and the construction is such that the shaft 75 may be driven by the shaft 65 without interfering with movement of the carriage B along its ways 10, 11. The rear end of the shaft 75 is adapted to be operatively connected to a short shaft 76 supported coaxially therewith in the gear case 72 by a clutch, designated generally by the reference character C, which clutch will be hereinafter more specifically described.

The rear end of the shaft 76 is provided with a spiral gear 77 continuously in mesh with a spiral gear 78 connected to the upper rear end of an inclined shaft 80, the upper end of which is rotatably supported in the gear case 72 while the lower end thereof is rotatably supported in the base A. The lower end of the shaft 80 is provided with a spiral gear 81 continuously in mesh with a spiral gear 82 on the right-hand end of a horizontal shaft 83 rotatably supported in a suitable housing 79 attached to the bed A. The left-hand end of the shaft 83 is rotatably supported in a suitable housing or bracket 89 fixed to the underside of the column 21 and is provided with a spiral gear 84 splined thereto and continuously in mesh with a spiral gear 85 on the lower end of a vertical shaft 86 telescopically splined to a shaft 87 in alignment therewith. The shaft 86 is rotatably supported in the bracket 89 and the shaft 87 in the slide 22. The gear 84 is carried by the column 21 and is splined to the left-hand end of the shaft 83 thereby permitting movement of the column 21 axially of the shaft 83 to permit adjustment or movement of the work W toward or from the grinding wheel G.

The upper shaft 87 has a spiral gear 88 fixed thereto, which gear is continuously in mesh with the spiral gear 90 on the rear end of a horizontal shaft 91 rotatably carried by the work head frame member 16 and the slide 22 coaxial with the axis of rotation of the work head frame member 16 in the slide. The forward end of the shaft 91 carries a drive gear 92 of a plurality of change gears including in addition to the gear 92 a gear 94. The change gears are carried by the work head frame member 16 and the driven gear 94 thereof is fixed to the left-hand end of a horizontal shaft rotatably supported in the work head frame member and provided with a worm 96 continuously in mesh with a worm wheel 97 fixed to the work spindle 15.

During the grinding operation, the grinding wheel is moved axially at a slow rate of speed by the lead screw 70 and cooperating nut 71 previously referred to. In the machine shown, the direction of movement is toward the rear, as viewed in Figs. 1 and 2; however, it is to be understood that the direction may be reversed depending upon the directions of relative rotation of the grinding wheel and work. In the present instance the lead screw 70 is driven during the grinding operation from the shaft 76, previously referred to, and which shaft is, in turn, driven by the shaft 75 and the spindle 65 upon which the grinding wheel is mounted, as previously described. For the purpose of rotating the lead screw 70, the rear end of the shaft 76 is provided with a gear 98 forming the driving gear of change gears, including in addition to the gear 98, gears 99, 100 and 101. The gear 101 which forms the driven gear of change gears referred to is keyed to the rear end of a short shaft 102 rotatably supported in the gear case 72 and provided with a worm 103 continuously in mesh with a worm wheel 104 keyed to a shaft 105 also rotatably supported in the gear case 72. The shaft 105 is provided with a worm 106 continuously in mesh with a worm wheel 107 fixed to a sleeve-like member 108 rotatably supported by suitable antifriction bearings upon the rear end of the lead screw 70. The sleeve 108 has a rearwardly projecting hub or portion which extends into a double-acting clutch of conventional construction, designated generally by the reference character D. Since the clutch D is of commercial construction, it will not be described in detail. Suffice it to say that when the actuating member 109 is shifted to the left, as viewed in Fig. 4, the member 108 is connected to the lead screw 70. When the actuating member 109 is shifted in the opposite direction; that is, toward the right, the clutch D operates to connect the lead screw to a sleeve-like member 120 rotatably supported in the gear case 72 and adapted to be driven under certain conditions of operation, as will be hereinafter described. The actuating member 109 of the clutch D is adapted to be manually operated from the front end of the machine by a lever 121 connected thereto in a suitable manner.

The lead screw 70 may be rotated by hand to adjust the carriage B by a hand wheel 110 connected to the front end of a shaft 111 operatively connected to the screw 70.

Preferably the machine comprises power means for reciprocating or moving the column 21 toward and from the grinding wheel G to retract the work spindle 15 to facilitate loading and unloading and to advance the column 21 to move the work into grinding position. In the embodiment shown, this means comprises a fluid pressure operated motor, not shown, but adapted to be both manually and automatically controlled. The manual control includes a lever 112 shown in neutral position which when moved either to the right or to the left, as viewed in Fig. 2, actuates the fluid pressure operated motor controlled thereby to move the column 21 either toward the right or left, respectively. Movement of the column 21 toward the right is preferably limited by the engagement of an abutment 113 fixed to the underside of the column 21 with an adjustable stop 113' adapted to be set in various positions by manual means including a hand wheel 114. The abutment 113 projects through a guard 115 into the right-hand part of the base A, as viewed in Fig. 2, where it engages the adjustable stop 113'. A flow control valve for controlling the rate of movement of the column 21 is indicated by the reference character 116. The fluid pressure actuated motor 30, previously referred to, is adapted to be manually controlled to raise and lower the slide 22 by a lever 117 similar to the lever 112. A flow control valve 118 similar to the flow control valve 116 is provided for controlling the rate of movement of the slide 22. It is to be understood, however, that in addition to the manual control shown, automatic controls are provided for controlling the flow of fluid pressure to the different motors, etc., so that the machine will perform an automatic cycle of operations and stop with the work spindle in a position to be reloaded.

In setting up an operation on the machine, the vertical column 21 is adjusted about the journals 51, 52 to position the vertical ways 27, 28 upon which the slide 22 reciprocates in parallelism with the thread or tooth on the grinding wheel G. This is accomplished by rotation of the hand wheel 63. Thereafter the work head frame member 16 is rotated or adjusted about the axis of the shaft 91 by means of the hand wheel 26 until the length of the teeth to be ground upon the work W is in parallelism with the thread or tooth on the grinding wheel. When the parts are thus positioned it will be apparent that when the work spindle is fed vertically by the fluid pressure actuated motor 30 moving the slide 22 upon its ways 27, 28 in the column, the direction of feed will be parallel to the length of the teeth on the work W. After the proper relative speeds of rotation of the grinding wheel and work have been selected by proper selection of the change gears 92, 94 and the proper feed of the carriage B by proper selection of the change gears 98, 99, 100 and 101, the motor 73 is started by pressing the appropriate start push button on the electric control panel 119, see Fig. 2, and the clutch C engaged.

The machine continues to operate with the grinding wheel and work rotating at predetermined speeds while the grinding wheel is fed slowly across the work and the work fed slowly in a generally vertical direction by the hydraulic motor 30 until the gear or work has been completely ground. Thereafter, the clutch C is disengaged, preferably automatically, to stop the feed and rotation of the work spindle; the lead nut 71 expanded to clear the lead screw 70; the carriage B returned to initial position; the slide 22 lowered to its original position; and a new piece of work substituted for the one ground. Assuming that the carriage B is returned to the same starting position each time, the rotation of the work W and the lead screw 70 can always be restarted for the same relative position of the grinding wheel because the clutch C is a single position clutch, as will be hereinafter described, and is in the drive for the respective movements referred to adjacent to the grinding wheel, the spindle of which is directly connected to the drive motor 73. In order to permit the clutch C to be re-engaged without undue strain upon the various parts of the machine, even though the grinding wheel is rotating at full speed, it includes a friction drive for bringing the respective parts to full speed before the positive engagement is effected.

Figure 4:
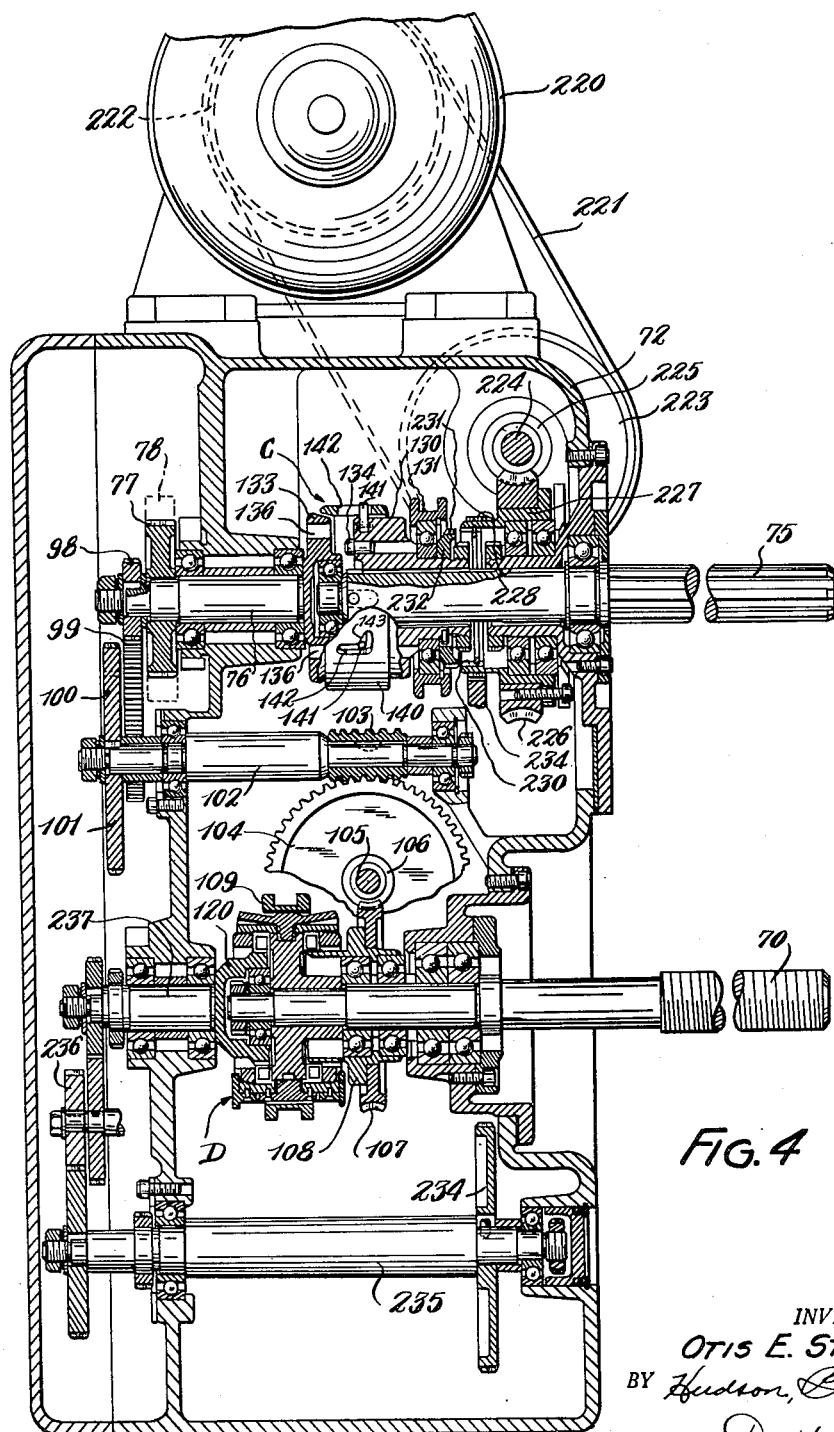
Fig. 4 is a developed sectional view of the gearing located in the gear box on the rear right-hand end of the bed.
Figure 5:
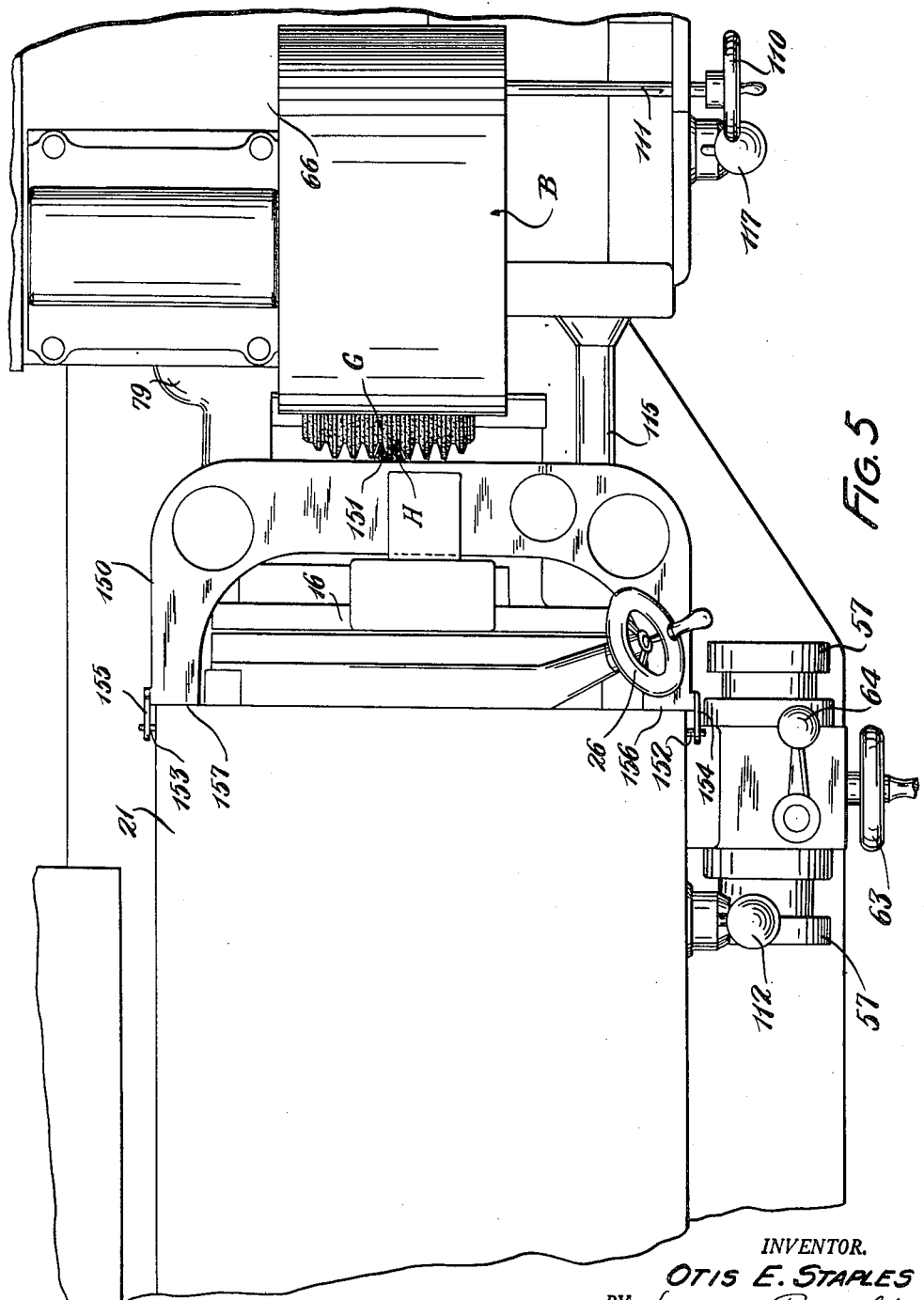
Fig. 5 is a fragmentary plan view similar to Fig. 1 but showing a crushing mechanism embodying the present invention in position on the machine.
Figure 6:
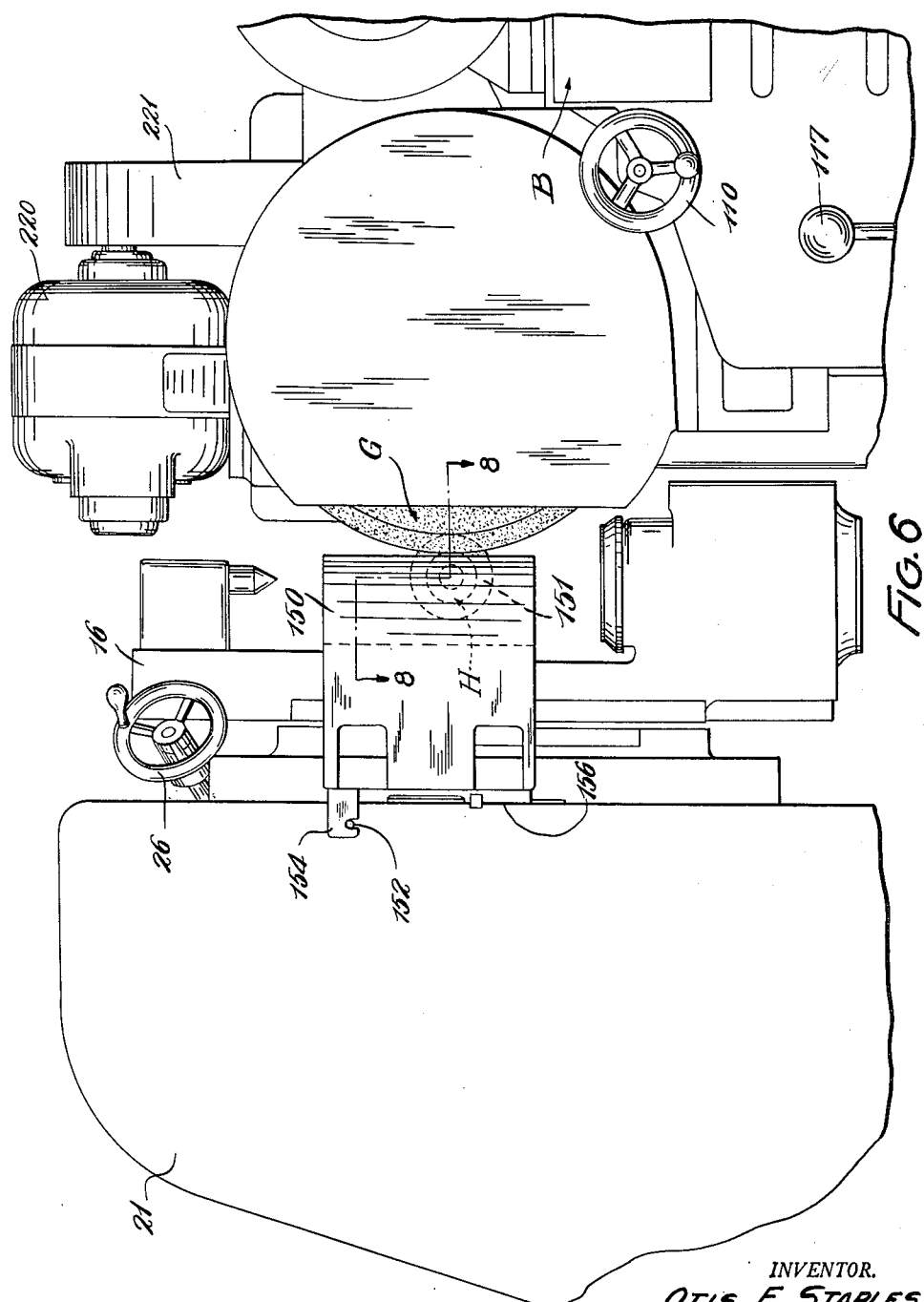
Fig. 6 is a front elevational view of the machine as shown in Fig. 5.
Figure 7:
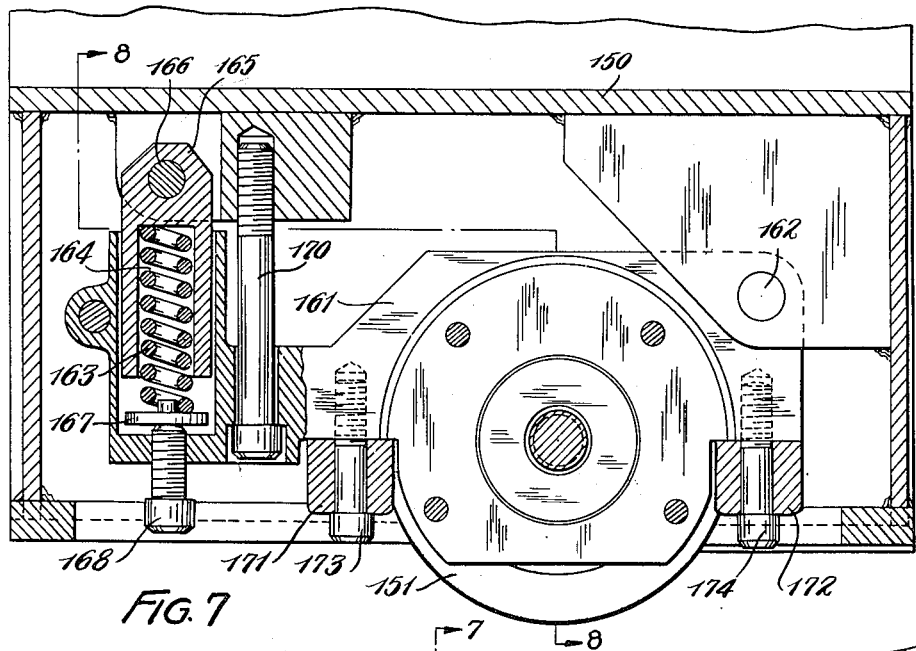
Fig. 7 is a fragmentary sectional view approximately on the line 7—7 of Fig. 8.

Referring particularly to Fig. 4, the clutch C comprises a driven member 130 splined upon the left-hand end of the shaft 75 and adapted to be reciprocated along said shaft by a sleeve 131 rotatably supported upon the member 130 and adapted to be engaged by a shift yoke, not shown. The shifting yoke is operatively connected by suitable mechanism to a clutch lever 132 at the front of the machine. When the driving member 130 of the clutch C is shifted toward the left, as viewed in Fig. 4, it is adapted to be positively connected to and drive the driven member 133 formed as an integral part of the right-hand end of the shaft 76. The drive between the two members of the clutch C is effected by two pins 134, only one of which is shown, fixedly secured to the driving member 130 and adapted to engage within suitable apertures 136 in the driven member 133. The pins 134 and the apertures 136 within which they engage, respectively, are at different distances from the axis of rotation of the clutch, with the result that the clutch is a single position clutch.

In order that the driven member 133 of the clutch C will be rotated at the same speed as the driving member 130 when the positive engagement between the two members is effected, the driving member 130 is provided with an external sleeve 140 slidable axially thereon and rotatable relative thereto within predetermined limits. The left-hand end of the sleeve 140 extends forwardly of the pins 134 and is provided with a beveled friction surface adapted to engage a similar friction surface on the exterior of the member 133. Rotation of the sleeve 140 relative to the member 130 is limited by a plurality of pins 141 fixed in the member 130. Each of the pins 141 projects into a longitudinal groove 142 in the sleeve 140. The right-hand ends of the grooves 142 are elongated and have inclined surfaces 143 against which the pins 141 normally engage when an attempt is made to engage the clutch because the friction between the friction surfaces, previously referred to, tends to rotate the sleeve 140 in a direction to position the pins 141 in the lower right-hand ends of the grooves 142. This prevents shifting the member 130 far enough to engage the pins 134 in the apertures 136 until the driven member 133 attains the same speed as the driving member 130, at which time the force tending to rotate the sleeve 140 in a direction to maintain the pin 141 decreases sufficiently for the shifting force to overcome the action between the pin 141 and the inclined surface 143 and move the sleeve thereby permitting the positive engagement of the clutch to be effected. Spring pressed detents, not shown, normally maintain the sleeve 140 in the forward position shown in the drawings.

The present invention contemplates the provision of novel and improved means for periodically crushing and dressing the grinding wheel G. The crushing mechanism, see Figs. 5 to 8, comprises a frame or bracket 150 adapted to be detachably connected to the column 21 with a crushing wheel H carried thereby in position to crush the grinding wheel G. Opposite sides of the vertical column 21 are provided with projecting pins 152, 153 adapted to be engaged by hook-like members 154 connected to or forming a part of the frame 150. The frame 150 is held in proper position with respect to the column 21 by the engagement of flat surfaces 156, 157 in the rear side of the frame with suitable surfaces upon the right-hand end of the column 21. The frame 150 is in the general form of a yoke and the construction is such that it can be positioned upon the column by merely removing the work arbor and positioning the work head frame member 16 so that the axis of the spindle 15 carried thereby is substantially vertical.

The crushing wheel H is detachably connected to a spindle 160 supported by antifriction bearings in a member 161 pivotally connected at its lower rear end by means of a pin 162 to projections forming a part of the frame 150. The upper end of the member 161 is continuously urged in a direction to engage the crushing wheel H with the grinding wheel G by a compression spring 163, one end of which is bottomed in an aperture 164 in a sleeve-like member 165 pivotally connected as by a pin 166 to the frame 150. The other end of the spring 163 abuts against a washer 167 secured to the adjacent end of an adjustment screw 168 which provides means for adjusting the force of the spring. The adjusting screw 168 is threaded into the upper end of the member 161 opposite to the end pivoted to the pin 162, which end is sleeve-like in form and telescopes over the free end of the member 165. This construction permits the member 161 to pivot about the pin 162 under the action of the spring 163 and the engagement of the crush roller H with the grinding wheel G; in other words, the crushing wheel H is yieldably engaged with the grinding wheel G during the crushing operation. A positive stop in the form of a screw 170 fixed to the frame 150 is provided for limiting movement of the member 161 under the action of the spring 163. The head of the screw 170 engages the bottom of a countersunk in the member 161 and the shank projects through an enlarged opening so as not to interfere with the pivotal movement of the member 161. The crushing wheel assembly, including the crushing wheel H, the spindle 160 and the bearings, etc. within which the spindle is rotatably supported, can be removed as a unit by removing the clamps 171, 172 normally secured to the member 161 by screws 173, 174.

Figure 8:
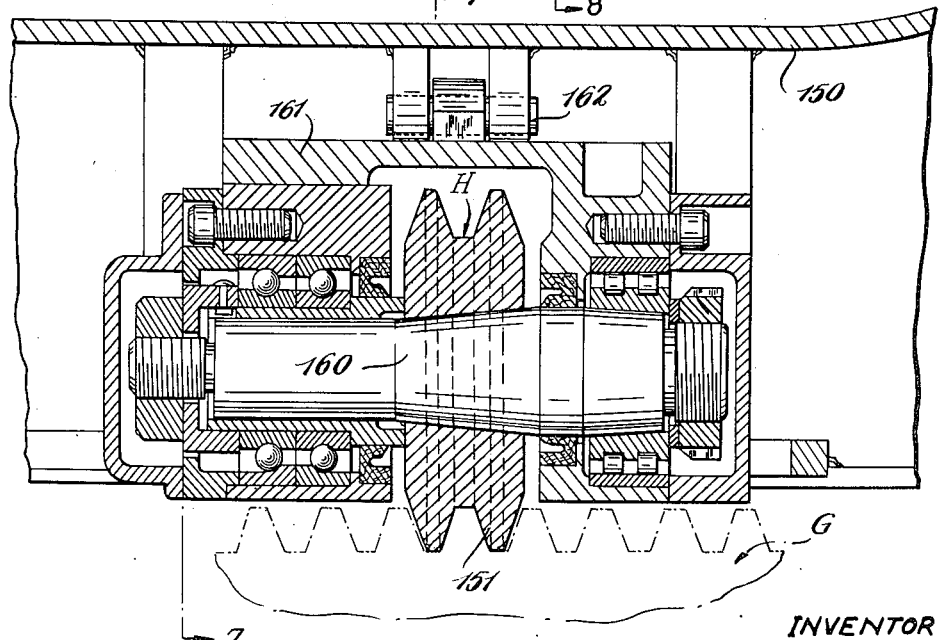
Fig. 8 is a fragmentary sectional view approximately on the line 8—8 of Figs. 6 and 7.
Figure 9:
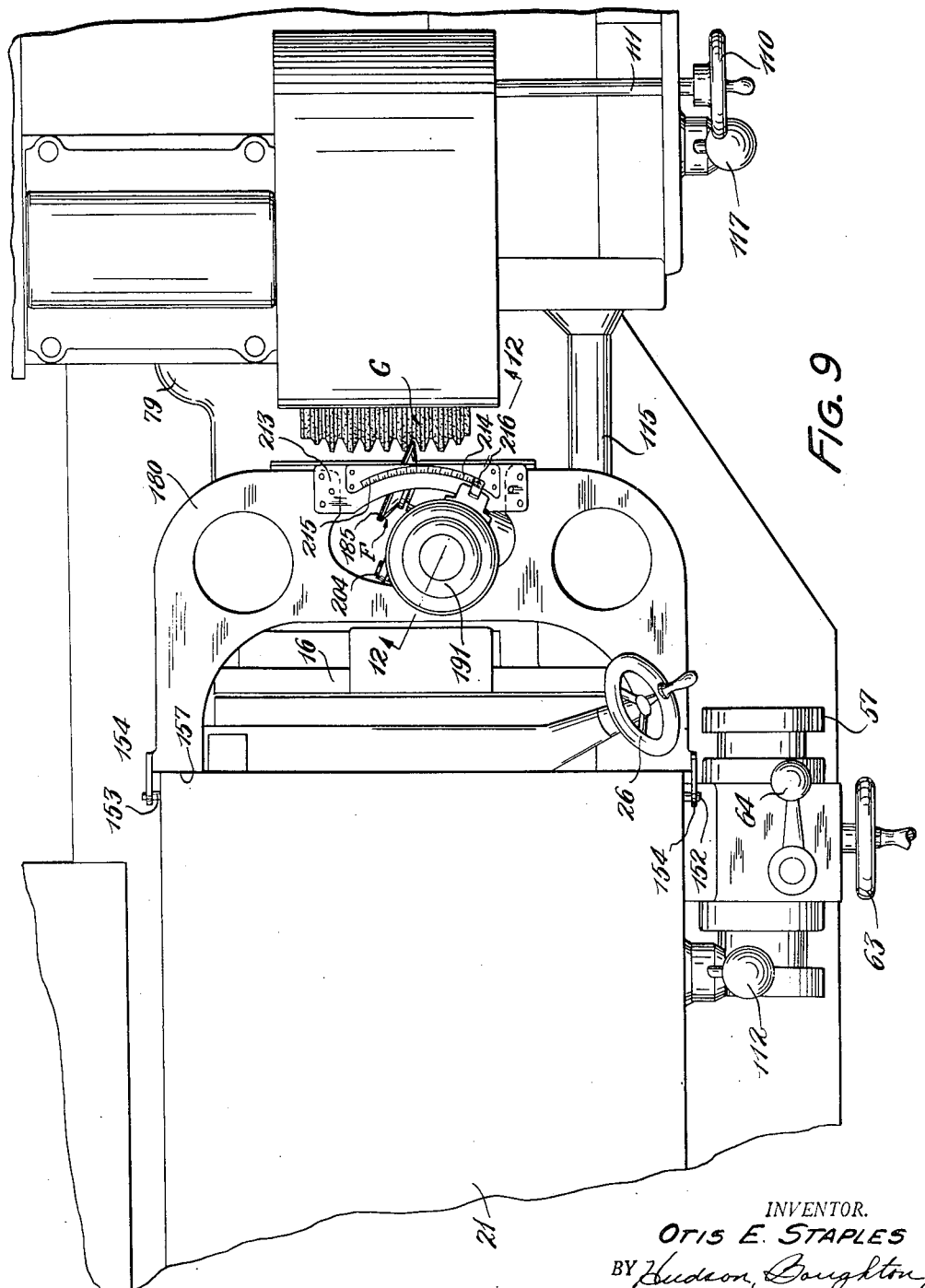
Fig. 9 is a plan view similar to Fig. 5 except showing a dressing mechanism embodying the present invention in position on the machine.

The crushing wheel H includes a plurality of annular teeth 151, in the embodiment shown two; however, any desired number may be employed. The teeth 151 are conjugate to the tooth or thread of the grinding wheel to be crushed except for the fact that the outside flanks of the two end teeth are relieved, as clearly shown in Fig. 8, thus reducing the liability of breaking off the tooth of the grinding wheel due to pressure of the crushing wheel against an unsupported part of the tooth. Reference to Fig. 8 will show that when the grinding wheel G and crushing wheel H are in the position shown therein, the tooth or that portion of the tooth on the grinding wheel engaged by the crusher is engaged on both of its flanks; that is, on opposite sides.

After the grinding wheel G is crushed, it is dressed by a grinding wheel, designated generally by the reference character F, forming a part of a detachable dressing attachment comprising a frame 180 similar to the frame 150 of the crushing attachment and adapted to be detachably connected to the column 27 in a similar manner. The grinding wheels F, of which there are two, for a purpose hereinafter referred to, are connected to opposite ends of a spindle 181 rotatably supported by suitable antifriction bearings in a bracket 182. As shown, the grinding wheels F each comprises a metal wheel 183 having a flat radial surface 184 on its outer side, which surface is faced or provided with a grinding disk 185. The wheel 183 at the side opposite the grinding disk 185 is beveled or cut away as at 189 so that the periphery of the wheel can enter the interdental spaces of the grinding wheel G, see Fig. 14.

The bracket 182 is pivotally connected to a member 186 for rotation about an axis parallel to the axis of the spindle 181 by a pin 187. The pin 187 is fixed in the forwardly projecting ends of arms 188, 190 forming the upper part of the member 186 and the bracket 182 is connected thereto by suitable antifriction bearings. The spindle 181 and in turn the grinding wheels F carried thereby are adapted to be rotated by an electric motor 191 mounted upon the upper end of the bracket 182. The rotor shaft 192 of the motor 191 is connected by a coupling 193 to the upper end of a shaft 194 rotatably supported by antifriction bearings in the bracket 182. The shaft 194 extends at right angles to the spindle 181 and is operatively connected thereto by a worm 195 formed integral on the shaft 194 intermediate its ends, which worm is continuously in mesh with a worm wheel 196 keyed to the spindle 181. The lower reduced end of the shaft 194, as viewed in Fig. 12, has a small worm 200 keyed thereto, which worm is continuously in mesh with a worm wheel 201 on a shaft 202 below the spindle 181 and parallel thereto. The shaft 202 is rotatably supported in the bracket 182 by suitable antifriction bearings and extends to the rear of the bracket, as clearly shown in Fig. 13, where it is provided with an eccentric 203 having a pitman 204 connected thereto through the medium of an antifriction bearing. The other end of the pitman 204 is pivotally connected to a screw 205 fixed to a boss 206 formed integral with the lower end of the member 186. The construction is such that upon operation of the motor 191, the grinding wheels F are driven and the housing or bracket 182 is oscillated about its pivot 187 by rotation of the eccentric 203 and its connection with the pitman 204. This superimposes upon the rotation of the grinding wheels a slight oscillation in a plane parallel to their working surfaces, thus distributing the grinding operation over a slightly larger area of the grinding wheel than would otherwise be the case and preventing the formation of continuous grooves in the surface being ground.

Figure 11:
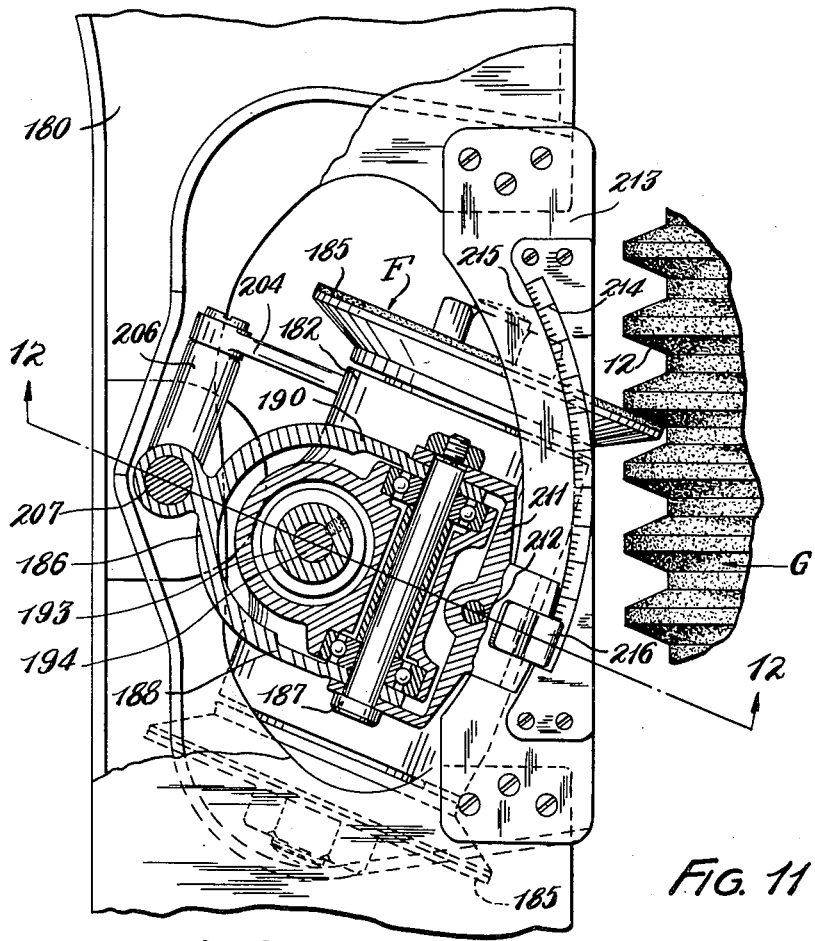
Fig. 11 is an enlarged fragmentary plan view with portions broken away and in section, approximately on the line 11—11 of Figs. 10 and 12.

In order to provide for the grinding of opposite sides of the tooth on the grinding wheel and to provide for the grinding of teeth having different pressure angles, the member 186 which carries the grinding wheels F is pivotally supported by a pin 207 for rotation about an axis parallel to the axis of the shaft 194 and at right angles to the spindle 181. The pin 207 is fixely secured to the member 186 and is rotatably supported by means of suitable antifriction bearinsg in the housing 180, see Fig. 12. The housing 186 may be secured in any desired angular position by means of a clamp 210 connected to the underside of a member 211 by a clamp screw 212. The member 211 includes projecting end flanges by which it is fixedly secured to the ends of the arms 188, 190 of the member or bracket 186. A plate-like member 213 detachably connected to the frame 180 and provided with suitable graduations 214 projects underneath the right-hand end of the member 211 and above the right-hand end of the clamp 210, as viewed in Fig. 12, and the member 211 can be securely clamped thereto by tightening the clamp 210 by rotating the screw 212. Since most gears are of one pressure angle the plate 213 preferably has notches 215 therein at the positions into which the housing 186 is most often adjusted, which notches are adapted to be engaged by a latch 216 carried by the member 211. In operation, the one side of the tooth 12 on the grinding wheel G is ground by one of the grinding wheels F with the member 186 adjusted in one position; for example, the position shown in Fig. 11. The other side of the tooth 12 is ground by the other grinding wheel F with the member 186 adjusted a suitable distance adjacent to the opposite end of the scale 214.

During both the crushing and the dressing operations, the carriage B upon which the grinding wheel G is supported is moved longitudinally of the axis of the grinding wheel and the grinding wheel G rotated in timed relation thereto so that the crushing wheel 151 or the grinding wheel F is operated as though in mesh with the grinding wheel G. During the crushing and grinding operations, the grinding wheel G is preferably operated at a slower rate of speed than the speed at which it normally operates and, in the embodiment shown, during the crushing and dressing operations, the motor 73 which normally drives the grinding wheel is deenergized and the grinding wheel driven from a motor 220 mounted on the top of the gear box 72. The motor 220, see Fig. 4, is connected by a belt 221 and suitable pulleys 222, 223 to a shaft 224 rotatably supported in the gear case 72 and extending at right angles to the shaft 75. The shaft 224 is provided with a worm 225 continuously in mesh with a worm wheel 226 rotatably supported by antifriction bearings in the gear box 72 coaxial with the shaft 75. As shown, the worm wheel 226 is bolted to a sleeve-like member 227, which member in turn has an external gear 228 and internal clutch teeth 230 formed integral therewith. The clutch teeth 230 are adapted to be selectively engaged by cooperating clutch teeth 231 on a clutch element 232 fixedly secured to the member 130, previously referred to, and which member is splined to the left-hand end of the shaft 75. The construction is such that the sleeve-like member 227 can be operatively connected to the shaft 75 by shifting the member 130 to the right a sufficient distance to engage the clutch teeth 230, 231. The gear 228 is continuously in mesh with a gear 234 keyed to a shaft 235 rotatably supported in the gear box 72 and extending parallel with the axis of rotation of the shaft 75. The shaft 235 is adapted to be connected by change gears designated generally as 236, to a stud shaft 237 rotatably supported in the gear box 72. The shaft 237 has the driven member 120 of the clutch D, previously referred to, formed integral therewith.

From the foregoing, it is believed that the operation of the drive just referred to will be apparent. Suffice it to say that when the member 130 of the clutch C is shifted to the right, as viewed in Fig. 4, to engage the clutch teeth 230, 231 and the clutch D is shifted to engage the left-hand side thereof; that is, to connect the driven member 120 to the screw 70, the grinding wheel G will be rotated at a relatively slow rate of speed and fed or moved axially by the lead screw 70 upon operation of the motor 229.

From the foregoing description of the preferred embodiment of the invention, it will be apparent that the objects heretofore enumerated and others have been accomplished and that there has been provided a novel and improved grinding machine including crushing and dressing attachments. While the preferred embodiment of the invention has been shown and described in considerable detail, the invention is not limited to the particular construction illustrated and it is my intention to cover hereby all adaptations, modifications and uses thereof which come within the practice of those skilled in the art to which the invention relates and within the scope of the appended claims.

Having thus described my invention, I claim:

1. In a machine for finishing the teeth of gears, splines and the like by grinding, a frame, a carriage slidably supported on said frame for movement in a linear direction, a spindle rotatably supported on said carriage with its axis of rotation extending parallel to said direction of movement thereof, a grinding wheel fixed to said spindle and having a helical tooth or thread on its periphery conjugate to a gear to be ground thereby, means for rotating said spindle, means for moving said carriage in timed relation to the rotation of said spindle, a column spaced from said spindle, a bracket movably conected to said column, and a crushing wheel rotatably supported in said bracket for crushing said grinding wheel on said spindle, said crushing wheel having teeth thereon conjugate to the gear to be ground and having the outside flanks of the end teeth undersize.

2. In a machine for finishing the teeth of gears, splines and the like by grinding, a frame, a carriage slidably supported on said frame for movement in a linear direction, a spindle rotatably supported on said carriage with its axis of rotation extending parallel to said direction of movement thereof, a grinding wheel fixed to said spindle and having a helical tooth or thread on its periphery conjugate to a gear to be ground thereby, means for rotating said spindle, means for moving said carriage in timed relation to the rotation of said spindle, a column spaced from said spindle, a bracket detachably connected to said column, a member carried by said bracket for movement towards and from said spindle, a crushing roller rotatably supported in said member for crushing said grinding wheel on said spindle, said crushing roller having a plurality of annular teeth thereon conjugate to the gear to be ground and having the outside flanks of the end teeth undersize, and means for resiliently urging said member in a direction to engage said crushing roller with the grinding wheel.

3. In a machine for finishing the teeth of gears, splines and the like by grinding and having a frame, a carriage slidably supported on said frame for movement in a linear direction, a spindle rotatably supported on said carriage with its axis of rotation extending parallel to said direction of movement thereof, a grinding wheel fixed to said spindle and having a helical tooth or thread on its periphery conjugate to a gear to be ground thereby, means for rotating said spindle, means for moving said carriage in timed relation to the rotation of said spindle, a column spaced from said spindle, a bracket detachably connected to said column, a first member pivotally supported in said bracket for rotation about an axis offset from and angularly disposed with respect to the axis of rotation of said spindle, a second member pivotally supported by said first member for rotation about an axis at right angles to the pivotal axis of said first member, a grinding wheel rotatably supported in said second member for rotation about an axis parallel with the pivotal axis of said second member, the last said grinding wheel having a plane grinding surface at right angles to its axis of rotation, means for oscillating said second member about its pivotal axis, and means for clamping said second member to said first member.

4. In a machine for finishing the teeth of gears, splines and the like by grinding and having a frame, a carriage slidably supported on said frame for movement in a linear direction, a spindle rotatably supported on said carriage with its axis of rotation extending parallel to said direction of movement thereof, a grinding wheel fixed to said spindle and having a helical tooth or thread on its periphery conjugate to a gear to be ground thereby, means for rotating said spindle, means for moving said carriage in timed relation to the rotation of said spindle, a column spaced from said spindle, a bracket detachably connected to said column, a member pivotally supported in said bracket for rotation about an axis offset from and angularly disposed with respect to the axis of rotation of said spindle, a second member pivotally supported by said first member for rotation about an axis at right angles to the pivotal axis of said first member, a pair of grinding wheels rotatably supported in said second member for rotation about an axis parallel with the pivotal axis of said second member, said grinding wheels having plane grinding surfaces at right angles to their axis of rotation, means for oscillating said second member about its pivotal axis, and means for clamping said second member to said first member.

References Cited in the file of this patent

UNITED STATES PATENTS

| | | |
|---|---|---|
| 261,624 | Olney | July 25, 1882 |
| 545,064 | Fleck | Aug. 27, 1895 |
| 1,040,905 | Dow | Oct. 8, 1912 |
| 1,882,848 | Marles | Oct. 18, 1932 |
| 1,933,872 | Olson | Nov. 7, 1933 |
| 2,507,371 | Eklund | May 9, 1950 |
| 2,571,293 | Ross | Oct. 16, 1951 |
| 2,595,591 | Lohutko | May 6, 1952 |
| 2,619,950 | Rickenmann | Dec. 2, 1952 |